United States Patent [19]
Tsujioka et al.

[11] Patent Number: 5,604,002
[45] Date of Patent: Feb. 18, 1997

[54] OPTICAL RECORDING MEDIUM AND REPRODUCING METHOD THEREFOR

[75] Inventors: Tsuyoshi Tsujioka, Osaka; Toshio Harada, Gunma; Kazuhiko Kuroki, Kyoto; Fumio Tatezono, Osaka, all of Japan

[73] Assignee: Sanyo Electric Co., Ltd., Osaka, Japan

[21] Appl. No.: 407,857

[22] Filed: Mar. 21, 1995

[30] Foreign Application Priority Data

Mar. 24, 1994 [JP] Japan ................................. 6-054164
Oct. 28, 1994 [JP] Japan ................................. 6-265687

[51] Int. Cl.⁶ ................................................. B32B 3/00
[52] U.S. Cl. ................ 428/641; 428/64.2; 428/64.4; 428/64.8; 428/913; 430/270.1; 430/270.11; 430/270.12; 430/523; 430/945; 369/283; 369/288
[58] Field of Search .................... 428/64.1, 64.2, 428/64.4, 64.8, 457, 913; 430/270, 495, 945, 270.1, 270.11, 270.12; 369/283, 288

[56] References Cited

U.S. PATENT DOCUMENTS

| | | | |
|---|---|---|---|
| 5,164,287 | 11/1992 | Nagae et al. | 430/345 |
| 5,175,079 | 12/1992 | Van | 430/338 |
| 5,215,868 | 6/1993 | Taniguchi | 430/332 |
| 5,234,799 | 8/1993 | Nagae et al. | 430/345 |
| 5,246,758 | 9/1993 | Matsui | 428/64 |
| 5,438,561 | 8/1995 | Van | 369/100 |
| 5,443,940 | 8/1995 | Tatezono | 430/270 |

FOREIGN PATENT DOCUMENTS

| | | |
|---|---|---|
| 5-225611 | 9/1993 | Japan. |
| 5-242524 | 9/1993 | Japan. |
| 5-266478 | 10/1993 | Japan. |

OTHER PUBLICATIONS

"Thermally Irreversible Photochromic Systems. Reversible Photocyclization of 1,2–Bis (benzo[b]thiophen–3–yl) ethene Derivatives," Bull. Chem. Soc. Jpn., vol. 63, pp. 1311–1315 (1990).

"Optical Recording Characteristics of Photochromic Media," Symposium on Optical Memory 1994.

Primary Examiner—Patrick Ryan
Assistant Examiner—Elizabeth Evans
Attorney, Agent, or Firm—Nikaido, Marmelstein, Murray & Oram LLP

[57] ABSTRACT

An optical recording medium includes a recording layer, and a masking layer which is converted to a state having small absorption at the wavelength of a reproducing beam due to progress of decoloration caused by a thermal reaction upon irradiation with the reproducing beam, or due to facilitation of decoloration caused by a photon mode photochromic reaction through temperature rise upon irradiation with the reproducing beam.

12 Claims, 6 Drawing Sheets

OPTICAL RECORDING MEDIUM AND REPRODUCING METHOD THEREFOR

CROSS REFERENCE TO RELATED APPLICATIONS

This application is related to application Ser. No. 08/356,589, filed Dec. 15, 1994.

BACKGROUND OF THE INVENTION

1. Field of the Invention

The present invention relates to an optical recording medium which can record and reproduce information in high density and a reproducing method therefor.

2. Description of the Background Art

In relation to an optical disk unit and an optical medium, the so-called MSR (magnetically induced super resolution) system has recently been watched with interest as a super resolution means for recording/reproducing information in/from regions smaller than a recording spot which is defined by the diffraction limit of light. Such an MSR system is disclosed in Technical Digest of Optical Data Storage Topical Meeting, 1991, Vol. 5, pp. 112 to 115 (Lecture No. TUB-3) and pp. 116 to 119 (Lecture No. TUB-4), for example. This system is characterized in that a plurality of magneto-optical recording films are employed with provision of a masking layer for masking peripheral information other than that for an information recording layer. Recorded information (recording marks) is transferred to the masking layer, whose temperature is increased by irradiation, by means of a relatively intense reproducing beam, whereby influences, caused by adjacent tracks and recording marks, in the linear density direction, are suppressed even if the recording density is increased, and therefore the optical resolution is improved.

On the other hand, Japanese Patent Laying-Open No. 5-225611 (1993), for example, discloses an optical recording medium which is provided with a masking layer including a light absorption center causing a nonlinear light absorption phenomenon such as a saturable absorption property, as an optical recording medium for attaining a similar super-resolution effect. Further, Japanese Patent Laying-Open No. 5-242524 (1993) discloses a recording/reproducing method similarly utilizing a nonlinear optical phenomenon, employing a spiro-selenazolino-benzopyran which exhibits inverse photochromism. In addition, Japanese Patent Laying-Open No. 5-266478 (1993) proposes a method employing a masking layer which is generally non-transmittable with respect to a reproducing beam, but exhibits partial transmission only in its central portion upon irradiation with a reproducing beam, which is controlled to exceed prescribed intensity on the central portion and again returns to the opaque state after passage of the reproducing beam. This reference discloses using an indoline spiropyran which exhibits inverse photochromism as a material for the masking layer.

In the conventional method employing the MSR system, however, the recording medium is disadvantageously limited to a magneto-optical recording medium.

Further, the method employing the nonlinear light absorption phenomenon generally requires extremely high light intensity, and hence information which is already recorded in the recording layer may be destroyed by heat generated when new or further information is applied.

In the super-resolution system utilizing inverse photochromism, in addition, reproduction is carried out by scanning the recording layer with a laser beam spot for decoloring the masking layer by a photochromic reaction. However, the masking layer thereafter naturally returns to a colored state due to a thermal reaction, and hence it is difficult to attain compatibility with a medium having no masking layer, i.e., employing no super-resolution optical recording technique. When the beam is impinged on the medium in reproduction, further, a coloring reaction is also caused by a thermal reaction with progress of decoloration by a photochromic reaction, and hence transmittance of the masking layer may be insufficiently improved.

SUMMARY OF THE INVENTION

An object of the present invention is to provide an optical recording medium which does not require an extremely high light intensity dissimilar to saturable absorption, wherein the light intensity is sufficiently low that information recorded in its recording layer is not destroyed by such heat as may be generated, and capable of attaining compatibility with an optical disk employing no super-resolution effect, and a drive therefor, which enables high-density recording/reproduction of information by a super-resolution effect.

An optical recording medium according to a first aspect of the present invention comprises a recording layer, and a masking layer which is converted to a state having low absorption at the wavelength of a reproducing beam due to decoloration which is caused by a thermal reaction upon irradiation with the reproducing beam.

An optical recording medium according to a second aspect of the present invention comprises a recording layer, and a masking layer which is converted to a state having low absorption at the wavelength of a reproducing beam due to facilitation of decoloration caused by a photon mode photochromic reaction through temperature rise upon irradiation with the reproducing beam.

In the optical recording medium according to the present invention, the masking layer is converted to a state having large absorption at the wavelength of the reproducing beam by a photon mode photochromic reaction upon irradiation with a beam of a specific wavelength which is different from the reproducing beam.

According to the present invention, the masking layer can be provided on the side of the recording layer directed toward the reproducing beam. The present invention may be applied to both a reflection type system and a transmission type, and the masking layer may be provided over or under the recording layer.

The optical recording medium according to the second aspect of the present invention is provided with the masking layer, which is facilitated in decoloration by a photon mode photochromic reaction through temperature rise upon irradiation with the reproducing beam, and is converted to a state having low absorption at the wavelength of the reproducing beam, as the result. This masking layer contains a photochromic material which is activated for photon mode reactivity by the temperature rise generated upon irradiation with the reproducing beam. Well-known spiropyran photochromic materials cannot be employed in the second aspect of the present invention because they exhibit coloration and/or achromatization as a result of a thermal reaction. Examples of a photochromic material employed in the second aspect of the present invention are a fulgide photochromic compound described later, and a diarylethene photochromic material expressed in the following general formula, for example:

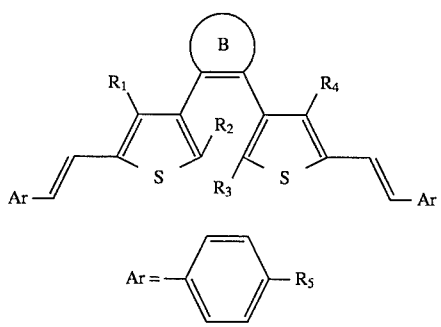

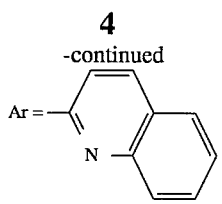

where $R_1$ to $R_5$ each represent an alkyl group, a halogen atom, a hydrogen atom, a trifluoromethyl group, an alkoxy group, a cyano group, an amino group or a dimethylamino group, and B represents a hydrocarbon ring or a heterocyclic ring.

Examples of the diarylethene material are compounds having the following structural formulas:

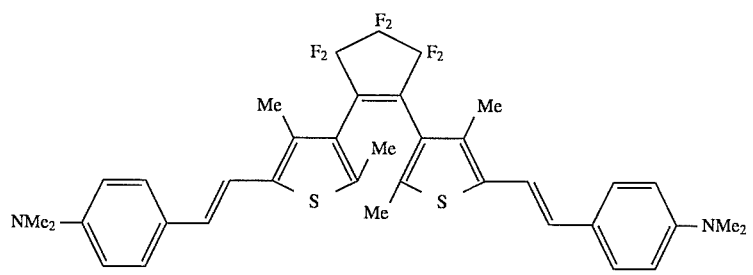

(Formula 3)

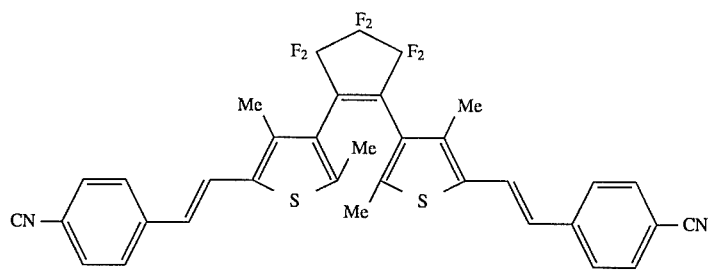

(Formula 4)

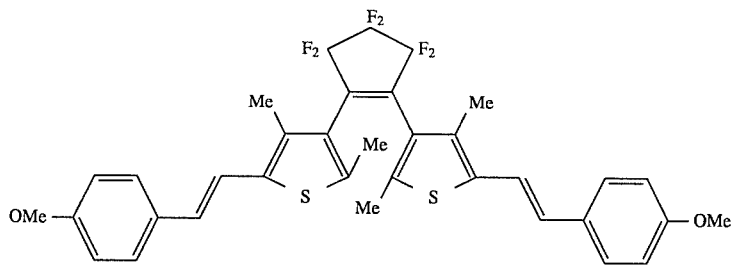

(Formula 5)

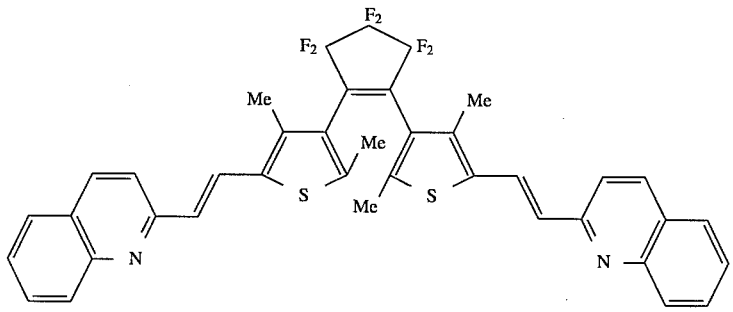

(Formula 6)

FIG. 7 illustrates temperature dependency levels of reaction sensitivity of the above diarylethene compounds. The abscissa shows the reciprocal of absolute temperature, and the ordinate shows quantity of irradiation light required for halving absorption. It is clearly understood from FIG. 7 that the quantity of irradiation light required for halving absorption is reduced as the temperature is increased, i.e., values on the abscissa are reduced and quantum yields are increased by raising the temperature, thereby increasing photochromic reaction sensitivity levels. Thus, these compounds are facilitated in photon mode photochromic reaction by raising the temperature. These compounds cause no decoloration even if the same are heated by the absorption of light. Thus, it is understood that no decoloration is caused by a thermal reaction. Thus, the photochromic material which is employed for the masking layer according to the second aspect of the present invention is preferably prepared from a material which does not cause either substantial decoloration or coloration by a thermal reaction, so that there is substantially no change in the absorption of the masking layer at the wavelength of the reproducing beam.

A reproducing method according to a third aspect of the present invention is adapted to irradiate the recording layer of the optical recording medium according to the first aspect of the present invention with a reproducing beam for reproducing information recorded therein, and comprises the steps of irradiating the masking layer with a first beam of a specific wavelength for reducing transmittance of the masking layer at the wavelength of the reproducing beam, and causing a thermal reaction by irradiating the masking layer having reduced transmittance, with the reproducing beam (a second beam), whose wavelength is different from the specific wavelength of the first beam whereby increase transmittance of a part of the masking layer corresponding to a reproducing beam spot, and irradiating the recording layer with the reproducing beam.

A reproducing method according to a fourth aspect of the present invention is adapted to irradiate the recording layer of the optical recording medium according to the second aspect of the present invention with a reproducing beam for reproducing information recorded therein, and comprises the steps of irradiating the masking layer with a beam, of a first specific wavelength for reducing transmittance of the masking layer at the wavelength of the reproducing beam, and causing a photon mode photochromic reaction which is facilitated by temperature rise by irradiating the masking layer having reduced transmittance with the reproducing beam whose wavelength is different from the specific beam wavelength of the first (a second beam), whereby to increase transmittance of a part of the masking layer corresponding to a spot of the reproducing, second beam, beam and irradiating the recording layer with the reproducing, second beam.

In the reproducing method according to the present invention, the first beam of a specific wavelength has a spot size which is larger than that of the reproducing, second, beam in general.

In order to attain a super-resolution effect by providing the masking layer, it is necessary to cause an increase of the transmittance of the masking layer, i.e., nonlinear reduction of absorptivity by irradiation with the beam. The super-resolution effect is increased as such nonlinearity is increased.

It was found that in the super-resolution reproducing system employing an photochromic material, of which decoloration sensitivity through a photon mode photochromic reaction does not change with a change in its temperature, for the masking layer, this nonlinearity is caused by using a masking layer having a high optical density, i.e., at low transmittance. FIG. 1 shows changes of masking layer transmittance values with respect to quantity of irradiated light. A curve A shows a transmittance change in a masking layer which is formed of such a photochromic material.

According to the first aspect of the present invention, the masking layer is made of a material which is converted to a state having low absorption at the wavelength of the reproducing beam by means of a thermal reaction. In such a reaction, the thermal decoloration is abruptly caused when the temperature exceeds a constant level, which is a threshold value in general. Curve B in FIG. 1 shows a transmittance change in a masking layer according to the present invention. It is understood that higher nonlinearity of transmittance change is attained in this case.

According to the second aspect of the present invention, the masking layer is made of a material which is converted to a state having small absorption at the wavelength of the reproducing beam by a photon mode photochromic reaction facilitated by temperature rise. Also in the case of this reaction, photon mode decoloration abruptly progresses at a temperature exceeding a constant level while irradiating with a reproducing beam, to attain large nonlinearity as shown in the curve B in FIG. 1.

In the first aspect of the present invention, the decoloration is caused by a thermal reaction and hence decoloration of the masking layer may simultaneously take place by a thermal reaction which is caused upon irradiation with a coloring beam having a specific wavelength, to result in an insufficient masking effect. In order to prevent this, it is necessary to increase the coloring spot for reducing energy density, while the quantity of irradiation light may be so insufficient that coloring is insufficient when the energy density is reduced. In the second aspect of the present invention, the decoloration caused by a photon mode photochromic reaction which is facilitated by temperature rise as well as the coloration caused by a photon mode photochromic reaction are employed and hence it is possible to make the masking layer cause neither coloration nor decoloration by only a thermal reaction. Thus, no decoloration is caused by heat generated upon irradiation with a coloring beam and no coloration is caused by heat generated upon irradiation with a reproducing beam, whereby a high super-resolution effect can be attained with no problem in the first aspect described above.

On the other hand, it is also possible to bring the masking layer of the optical recording medium according to the second aspect of the present invention into an optically transparent state by irradiating it with a decoloration beam, since coloration and decoloration progress by a photon mode photochromic reaction. Such an optically transparent state can be maintained by storing the medium in a cassette which does not transmit light of the required wavelength. Therefore, it is possible to handle the optical recording medium similarly to that provided with no masking layer, thereby maintaining compatibility.

In the optical recording medium according to the present invention, the masking layer can be colored due to large absorption at the wavelength of the reproducing beam caused by a photon mode photochromic reaction upon irradiation with a beam of a specific wavelength which is different from the reproducing beam.

In one of preferred modes of the present invention, the spot size of a coloring beam is made larger than the spot size of a reproducing beam. FIG. 2 is a plan view showing the relation between a reproducing beam spot and a coloring beam spot in the said one of the preferred modes of the present invention. Referring to FIG. 2, a coloring beam spot 1 is applied in advance of a reproducing beam spot 3, to form a colored region 2 in a masking layer by the coloring beam spot 1. The colored region 2 is formed since absorption at the wavelength of the reproducing beam is increased by the coloring beam spot 1 having a specific wavelength due to a photochromic reaction. This coloring beam spot 1 is sized to be larger than the reproducing beam spot 3 and to include recording marks 14 of a track which is adjacent to recording marks 13 of a reading track. Such a setting leads to masking the recording marks of the adjacent track and preventing it from causing crosstalk upon reproducing.

The reproducing beam spot 3 moves in the same direction as the coloring beam spot 1, so that a rear half 4 of its central portion has particularly large quantity of irradiation light and a high temperature. Therefore, in the rear half 4, a photon mode photochromic reaction which is facilitated by temperature rise or a thermal reaction progresses to reduce absorption at the wavelength of the reproducing beam and to improve transmittance. Therefore, the transmittance is so increased in the rear half 4 of the reproducing beam spot 3 that the recording layer is irradiated with the reproducing beam at the rear half 4 which is smaller than the reproducing beam spot 3. Thus, influences by the recording marks 14 of the adjacent track are masked and it is possible to reduce the track pitch. Referring to FIG. 2, numeral 12 denotes recording marks as read. While the masking layer remains in the state having high transmittance after reading of the recording marks as shown in FIG. 2, the coloring beam spot 1 is applied in advance of the reproducing beam spot 3 when the reproducing beam spot 3 moves to the adjacent track. Therefore, the masking layer is colored by the coloring beam spot 1 and no influences are exerted by the read recording marks when information is read from the adjacent track.

When a coloring beam spot is applied in advance of a reproducing beam spot for coloring a masking layer, decoloration may disadvantageously be caused simultaneously with coloration by heat which is applied by the coloring beam spot since the masking layer according to the first aspect of the present invention is decolored by heat. Also in consideration of this point, it is preferable to set the coloring beam spot at a size which is larger than the reproducing beam spot as shown in FIG. 2, for reducing the quantity of heat as generated by dispersing energy caused by the coloring spot. As hereinabove described, the masking layer according to the second aspect of the present invention is facilitated in decoloration through a photon mode photochromic reaction by temperature rise and coloration through a photon mode photochromic reaction and causes no decoloration directly by temperature rise, and hence no decoloration is caused in the masking layer upon irradiation with a coloring beam spot. Thus, it is possible to attain sufficient coloring by the coloring beam spot, thereby attaining a sufficient super-resolution effect.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 4:
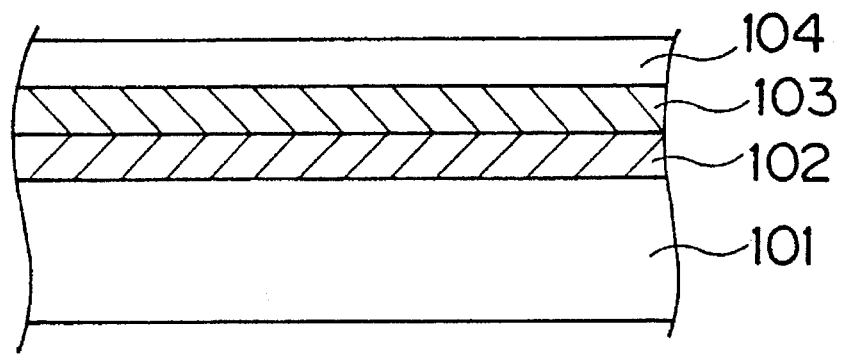
FIG. 4 illustrates the structure of an optical recording medium according to the embodiment of the present invention.

FIG. 4 is a sectional view showing an optical recording medium according to an embodiment of the first aspect of the present invention. Referring to FIG. 4, a masking layer 102 is provided on a transparent substrate 101. The masking layer 102 contains molecules of a photochromic material which causes a photochromic reaction upon irradiation with a coloring beam and is reduced in transmittance as the result, while causing decoloration by a photochromic reaction facilitated by thermal reaction or heat upon irradiation with a reproducing beam and being reduced in transmittance. A recording layer 103 and a protective layer 104 are successively formed on the masking layer 102. The material for the recording layer 103 can be selected from various ones such as well-known magneto-optical materials and phase change materials, while a TbFeCo-based magneto-optical material is employed in this embodiment. The masking layer 102 is prepared from a spiropyran photochromic material having the following molecular structure:

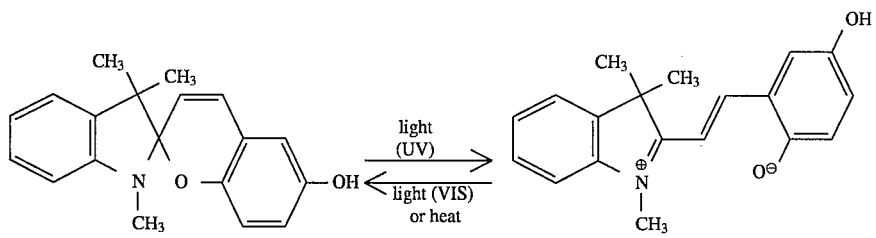

Figure 1:
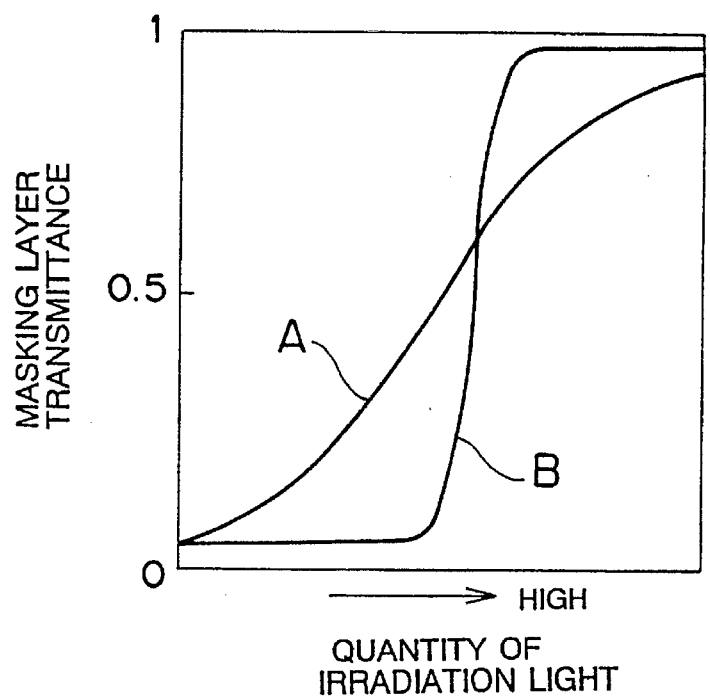
FIG. 1 is a diagram for illustrating nonlinear changes of masking layer transmittance values with respect to quantity of irradiation light.
Figure 2:
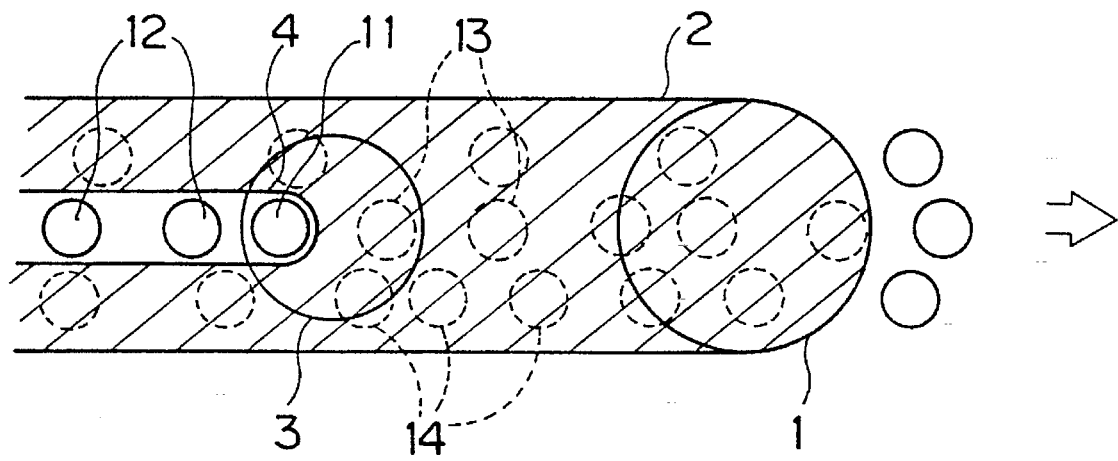
FIG. 2 is a plan view for illustrating a reproducing method according to a mode of the present invention.
Figure 3:
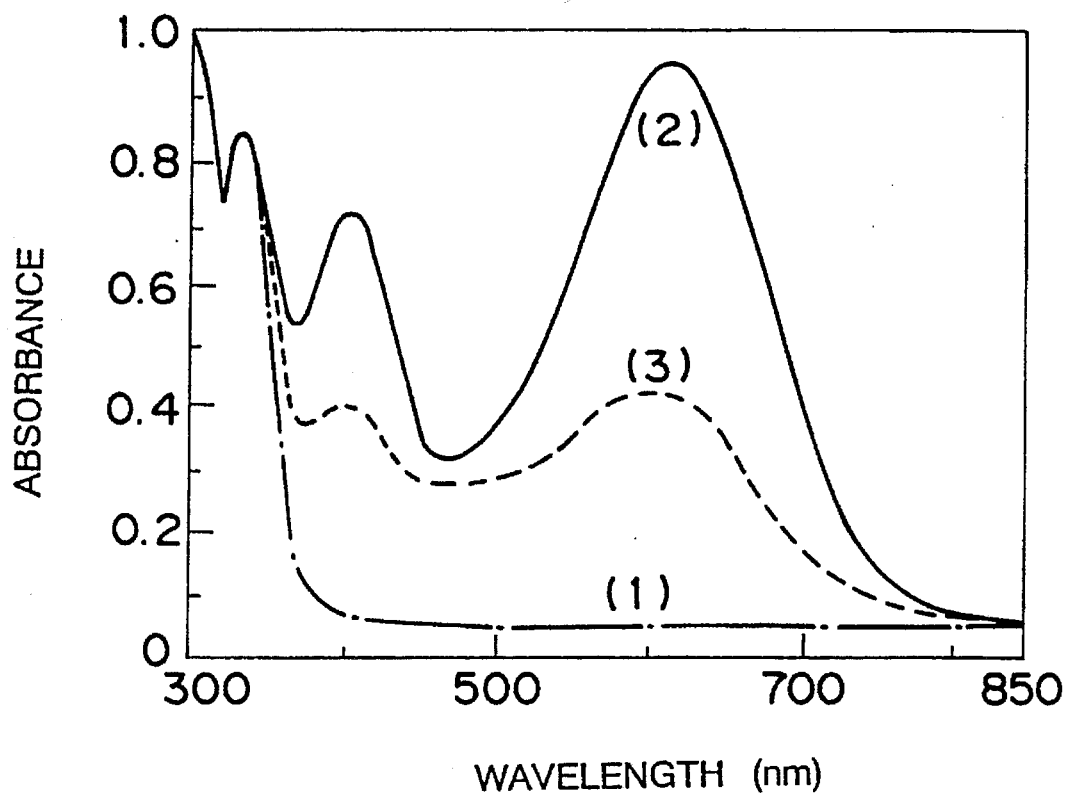
FIG. 3 illustrates absorption spectra of a photochromic material employed in an embodiment of the present invention.

FIG. 3 illustrates absorption spectra of the photochromic material having the aforementioned structure. Referring to FIG. 3, curves (1), (2) and (3) show absorption spectra in an unirradiated state, after irradiation with a beam of 350 nm, and after irradiation with a beam of 500 nm or after heat treatment, respectively. As shown in FIG. 3, this photochromic material has absorption in the ultraviolet wavelength region in an decolored state, and is converted to a colored state having absorption in the visible wavelength region upon irradiation with ultraviolet light (UV). While the photochromic material can be converted from the colored state to the decolored state by a photochromic reaction through irradiation with visible light (VIS), its sensitivity is low and can be converted to the decolored state mainly by a thermal reaction. In this embodiment, the masking layer 102 is decolored through a change caused by the thermal reaction, in accordance with the first aspect of the present invention.

It is possible to form the masking layer 102 by mixing the aforementioned photochromic material into polystyrene resin, dissolving the mixture in cyclohexanone and applying the same by spin coating. According to this embodiment, the masking layer 102 has a thickness of 0.3 μm. In such formation of the masking layer 102 by spin coating, the polystyrene resin may be replaced by another resin, while only a coloring matter may be dissolved in a solvent to form a thin film. Alternatively, the masking layer 102 may be formed by vacuum-depositing a coloring matter. The thickness of this masking layer 102 is preferably set to be smaller than the depth of focus (about 1 μm in general) of a reproducing laser beam spot.

An inventive sample of the embodiment shown in FIG. 4 was prepared by employing the transparent substrate 101 of a glass disk having a thickness of 1.2 mm, the recording layer 103 having a thickness of 0.1 μm, and the protective layer 104 of generally used ultraviolet setting resin having a thickness of 10 μm.

Various wavelengths were previously recorded in the recording layer 103 in a magnetic field modulation system, and information was reproduced by a method according to a fourth aspect of the present invention. A coloring beam was prepared by condensing an Ar laser beam having a wavelength of 360 nm, which was emitted from an ultraviolet laser, to a spot size of 2.0 μm. A reproducing beam was prepared by condensing a semiconductor laser beam having a wavelength of 630 nm to a spot size of 1.25 μm. The coloring beam power was 2.5 mW, the reproducing beam power was 1.5 mW, and the linear velocity was 1.4 m/sec. A comparative sample of an optical recording medium was prepared similarly to the inventive sample, except that the same was provided with no masking layer.

Figure 5:
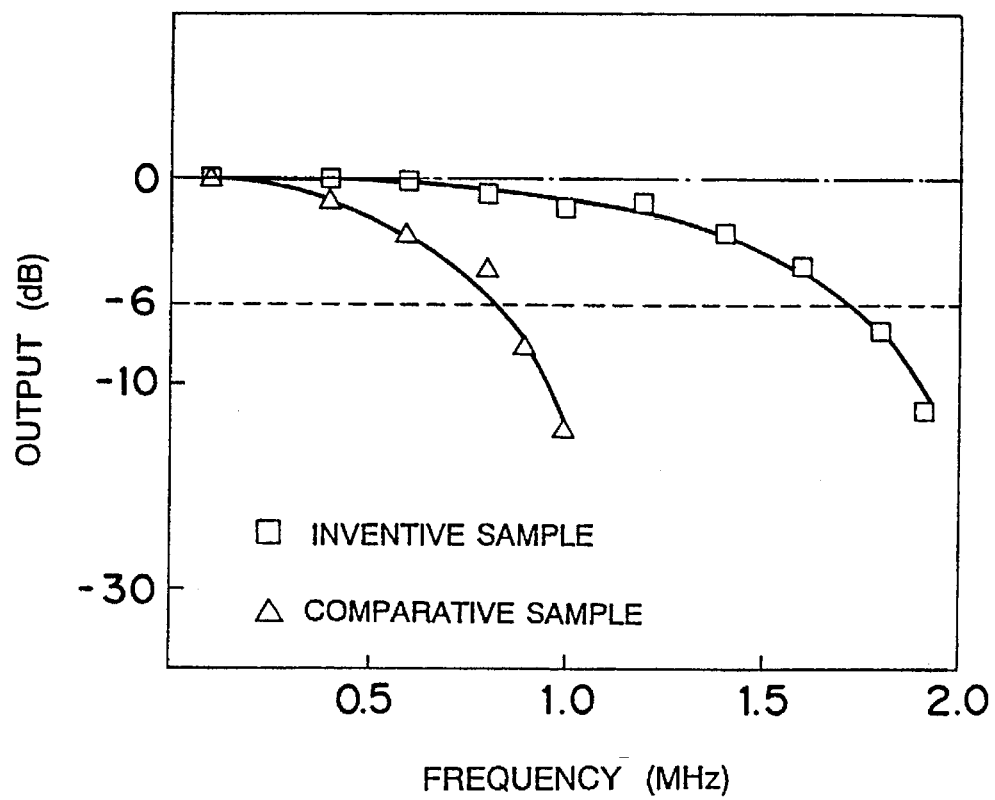
FIG. 5 illustrates frequency characteristics of reproducing signals in inventive and comparative samples.

FIG. 5 shows frequency characteristics of reproducing signals in the inventive and comparative samples, with reference to output values (0 dB) at a low frequency. As clearly understood from FIG. 5, the outputs were reduced by 6 dB at frequencies of 0.85 MHz (corresponding to a mark length of 0.82 μm) and 1.7 MHz (corresponding to a mark length of 0.41 μm) in the comparative and inventive samples respectively. Thus, it has been proved that the inventive optical recording medium was improved in linear recording density by about twice as compared with the comparative sample.

Further, track-to-track crosstalk at a track pitch of 0.6 μm was −15 dB in the comparative sample, while that in the inventive sample was reduced to about −33 dB. As clearly understood from this, it is possible to improve the track density in addition to the linear recording density according to the present invention.

Figure 8:
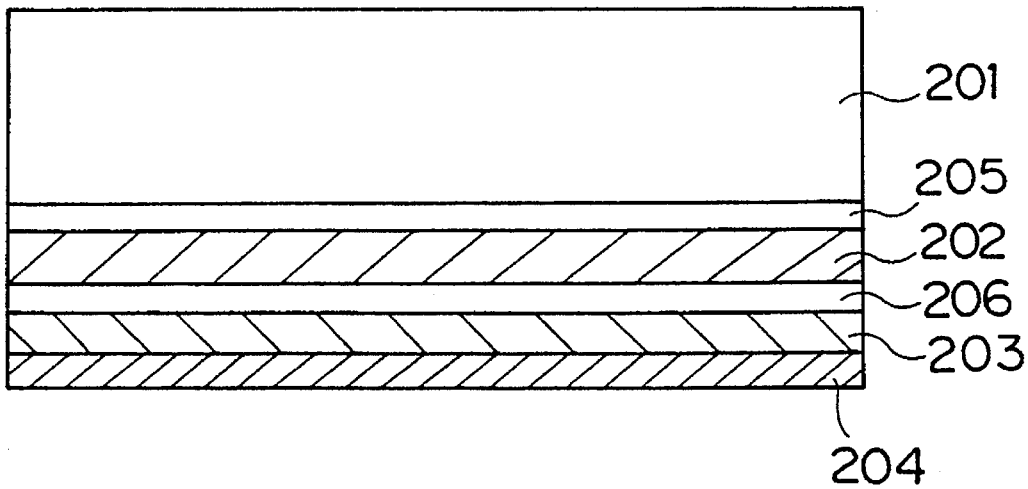
FIG. 8 is a sectional view showing the structure of an optical recording medium according to another embodiment of the present invention.

FIG. 8 is a sectional view showing an optical recording medium according to the second aspect of the present invention. Referring to FIG. 8, a dielectric layer 205, a masking layer 202, another dielectric layer 206, a recording layer 203 and a reflective layer 204 are successively stacked on a transparent substrate 201. The transparent substrate 201 is formed by a polycarbonate plate having a thickness of 1.2 mm. The dielectric layer 205 is formed by an AlN film having a thickness of 0.04 μm, which is prepared by sputtering. The masking layer 202 is formed by a polystyrene resin film having a thickness of 0.1 μm, which contains a diarylethene compound having a structure expressed in the following formula. The dielectric layer 206 is formed by an AlN film having a thickness of 0.05 μm, which is prepared by sputtering. The recording layer 203 is made of TbFeCo, which is a magneto-optical material, to have a thickness allowing light transmission, for example 0.05 μm. The reflective layer 204 is prepared by forming an Al film by sputtering and forming a protective layer of ultraviolet setting resin thereon. A sample of this optical recording medium was prepared (Example).

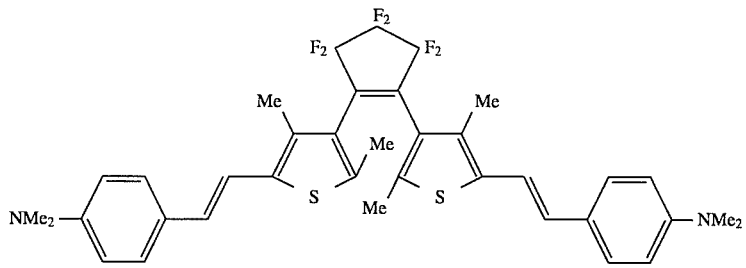

For the purpose of comparison, an optical recording medium was prepared in a structure similar to that shown in FIG. 8, except that its masking layer contained indoline spiropyran exhibiting inverse photochromism, which is disclosed in Japanese Patent Laying-Open No. 5-266478 (1993) (comparative example 1):

Further, another comparative optical recording medium was prepared in a structure similar to that shown in FIG. 8, except that its masking layer contained a diarylethene photochromic material which is expressed in the following formula, as a compound causing no thermal reaction with a photon mode reaction having substantially no temperature dependency (comparative example 2):

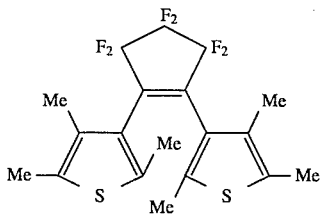

Figure 9:
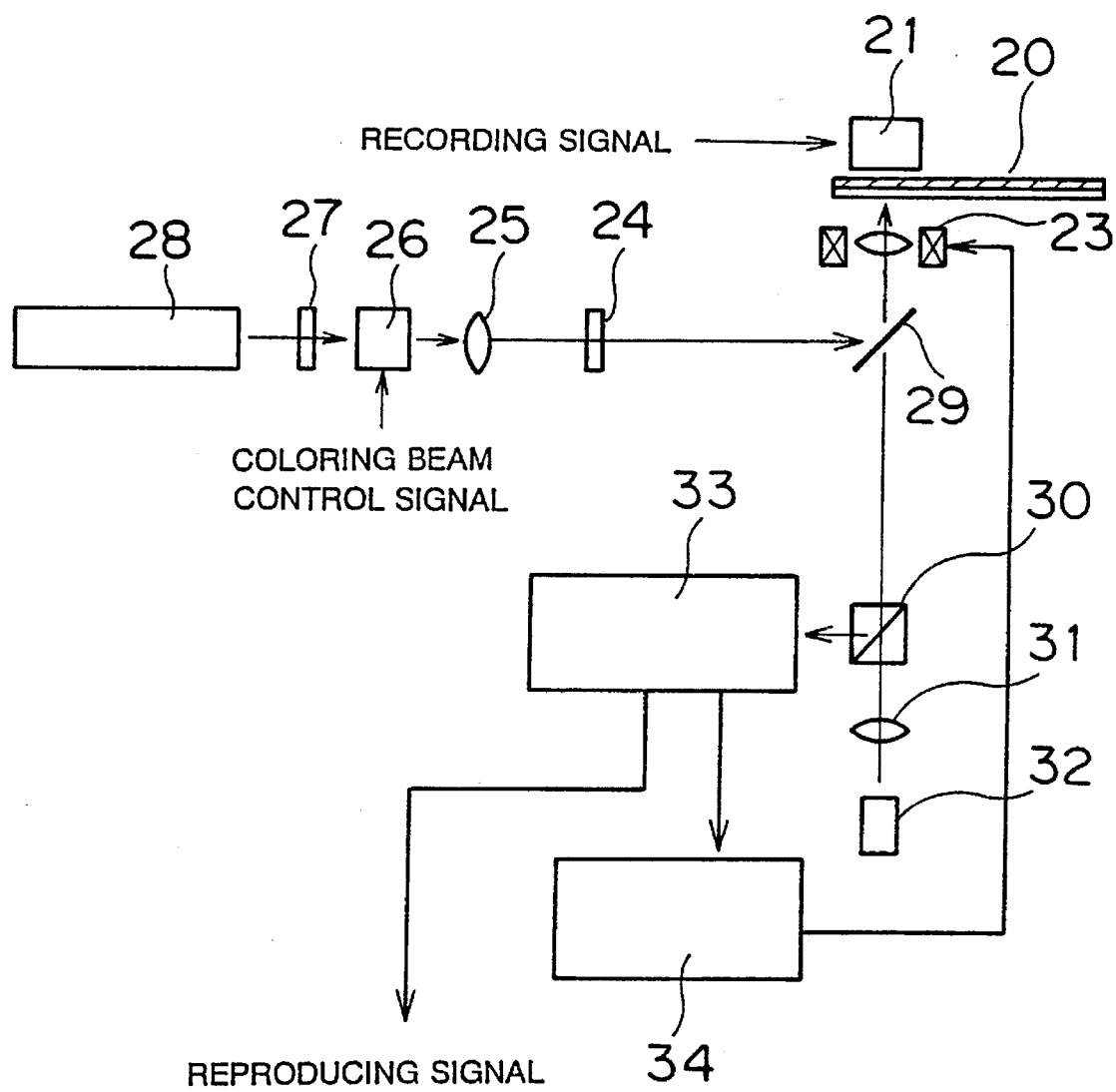
FIG. 9 is a block diagram showing a recording/reproducing apparatus employed in Example of the present invention.

Information was recorded in and reproduced from the optical recording media prepared in the aforementioned manner by a recording/reproducing apparatus shown in FIG. 9. Referring to FIG. 9, a masking layer of an optical disk 20 is in an decolored state in information recording, so that the optical disk 20 is irradiated with a laser beam having a wavelength of 670 nm which is emitted from a semiconductor laser 32. The laser beam which is emitted from the semiconductor laser 32 passes through a collimator lens 31, a polarized beam splitter 30 and a dichroic mirror 29, and is condensed on a recording layer of the optical disk 20 by an objective lens 23, for heating the recording layer. A magnetic field modulation coil 21 is provided on an opposite side of the optical disk 20 for changing an applied magnetic field in response to a recording signal, so that magnetic field modulation recording is carried out by actions of these elements.

In information reproduction, on the other hand, a coloring beam spot having a wavelength of 365 nm is emitted from an HeCd laser 28. This coloring laser beam is applied onto the optical disk 20 by the objective lens 23, through an ND filter 27, a control element 26 which is controlled by a coloring beam control signal, a collimator lens 25, an optical element 24 for controlling the shape of the coloring beam spot, and the dichroic mirror 29. This coloring beam spot is applied to the optical disk 20 to precede a reproducing beam spot. The reproducing beam spot is applied by condensing a beam which is emitted from the semiconductor laser 32 on the optical recording medium 20 through the objective lens 23, similarly to the information recording. The coloring beam spot is adjusted by the optical element 24 to have a spot size which is larger than that of the reproducing beam spot. The recording/reproducing beam spot is substantially in the form of a complete round having a spot size of 1.3 μm, while the coloring beam spot is formed to have a spot size of 2.2 μm.

The reproducing beam spot which is reflected through the recording layer of the optical disk 20 passes through the dichroic mirror 29 and is transferred to a servo/signal detection optical system 33 by the polarized beam splitter 30, so that a reproducing signal is taken out. A servo signal is transmitted to a control circuit 34, which in turn transmits a control signal for adjusting the objective lens 23.

The aforementioned recording/reproducing apparatus was employed in practice, to record signals having frequencies of 300 kHz to 6 MHz in the aforementioned respective optical recording media with semiconductor laser beams of 670 nm in wavelength when the masking layers were in decolored states with large transmittance values in a magnetic field modulation manner with recording power of 7 mW and relative speeds of 5.5 m/sec. The recorded signals were reproduced with reproducing beam power of 6 mW and coloring beam power of 5 mW, for measuring relations between frequencies and reproduction outputs.

Figure 10:
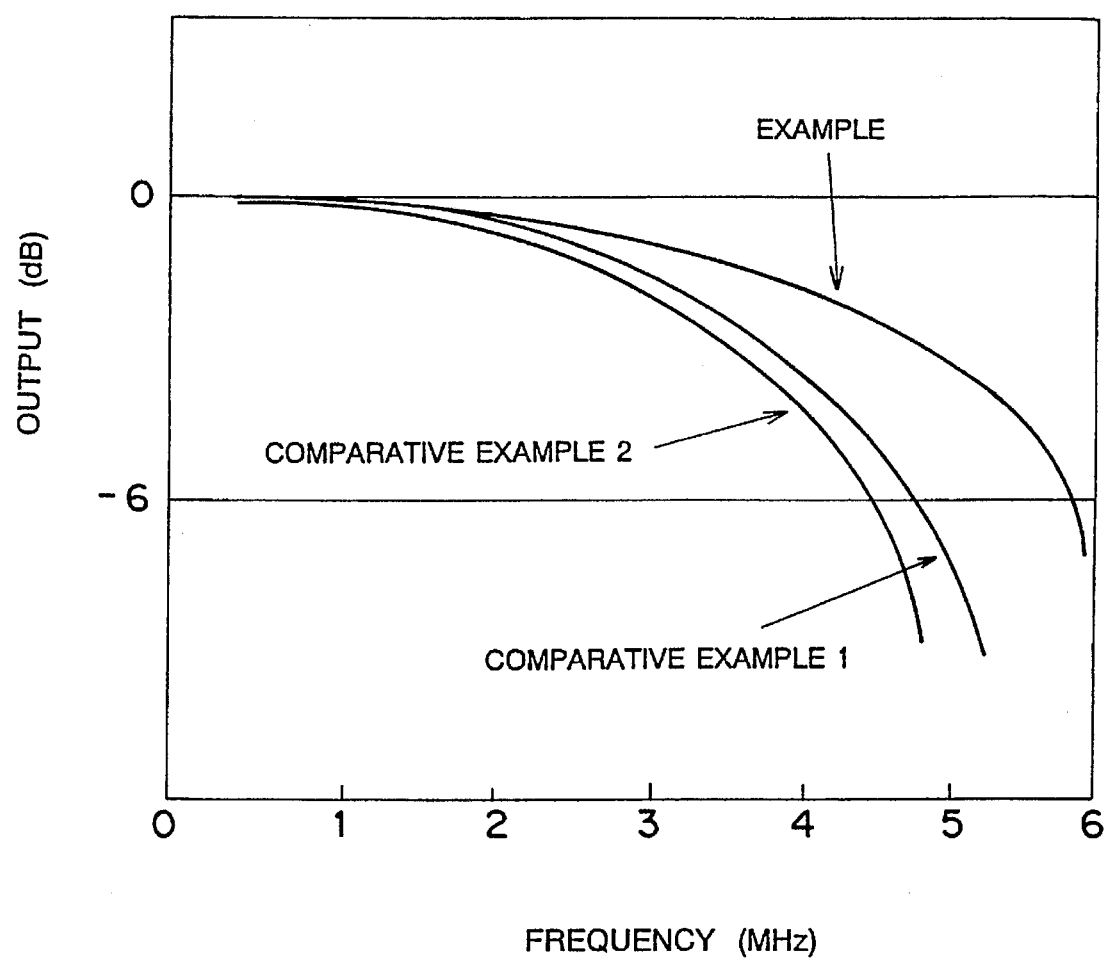
FIG. 10 shows relations between frequency characteristics and outputs in reproduction of information from optical recording media according to Example of the present invention and comparative examples.

FIG. 10 illustrates relations between frequency characteristics and outputs which were measured in the aforementioned manner. With reference to 0 dB at a frequency of 300 kHz, the outputs are reduced by 6 dB at frequencies of about 4.7 MHz, about 4.5 MHz and 5.8 MHz in comparative examples 1 and 2 and Example respectively, as shown in FIG. 10. Thus, it is understood that linear recording density was remarkably improved in the optical recording medium according to Example. It is possible to improve a super-resolution effect by providing a masking layer which is facilitated in photon mode photochromic reaction by temperature rise, thereby improving linear recording density. It is also possible to improve track density, in addition to the linear recording density.

While a diarylethene photochromic material is employed in the aforementioned embodiment, the material for the masking layer is not restricted to this but any material can be employed so far as the same causes decoloration by a photon mode photochromic reaction which is facilitated by temperature rise. For example, it is possible to employ a fulgide-based compound having the following structure, which is described in Nippon Kagaku Kaishi, No. 8 (1985), p. 1598, as the material for the masking layer according to the present invention:

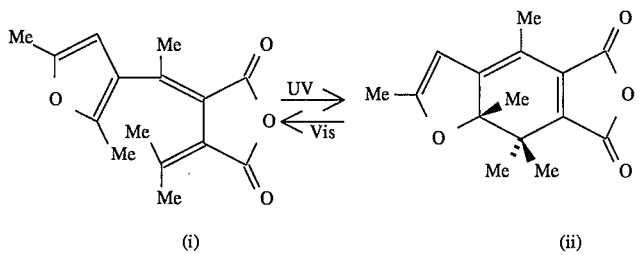

(i)          (ii)

Figure 6:
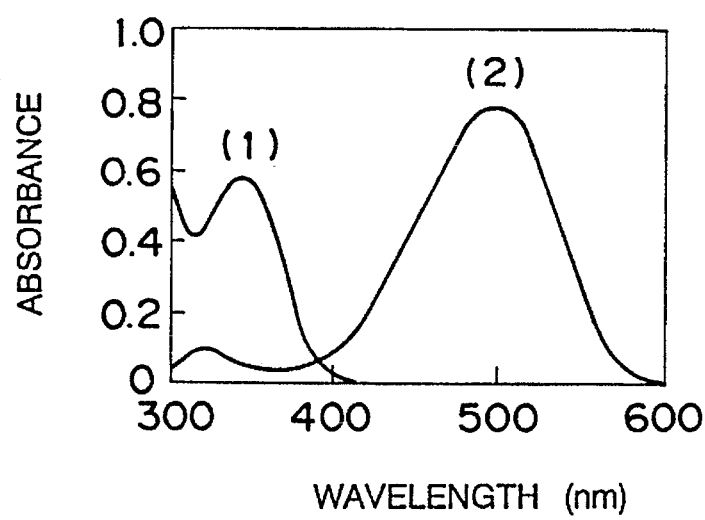
FIG. 6 illustrates absorption spectra of another photochromic material employable in the present invention.
Figure 7:
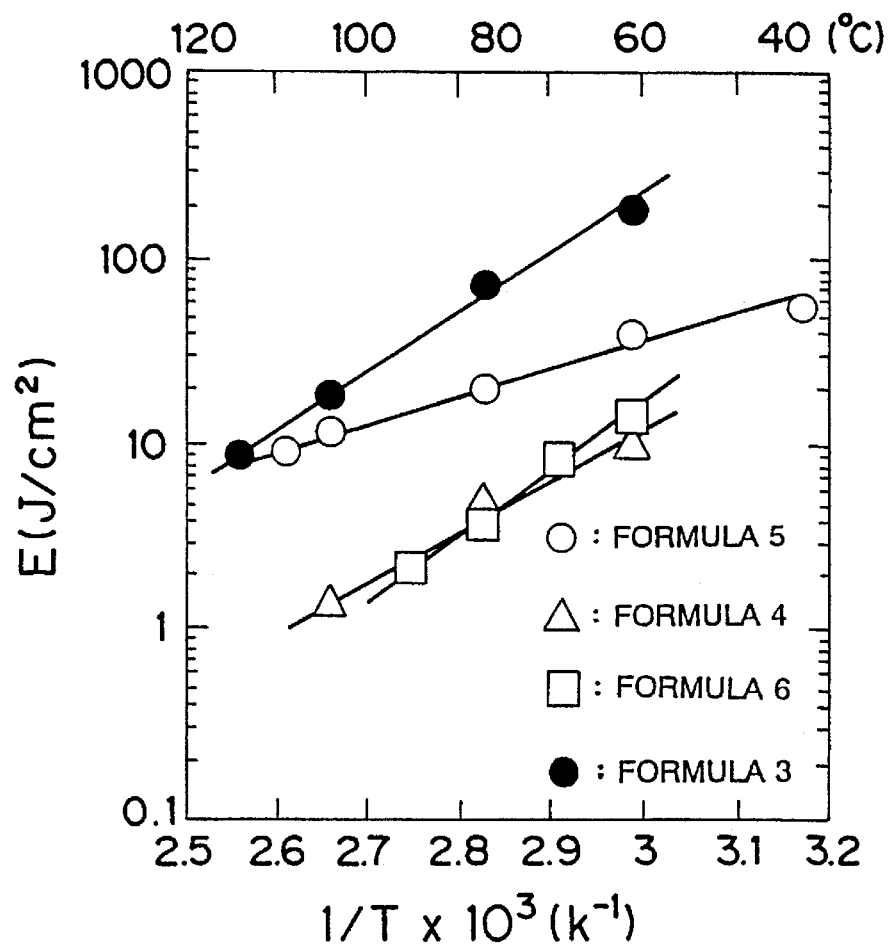
FIG. 7 illustrates temperature dependency values of reaction sensitivity levels of diarylethene photochromic compounds which are employable for a masking layer according to the present invention.

FIG. 6 illustrates absorption spectra of the fulgide-based compound having the aforementioned structure. Curves (i) and (ii) show absorption spectra in decolored and colored states respectively. In this fulgide-based compound, the quantum yield of a photon mode photochromic reaction which is an decoloration reaction is increased with the temperature. Therefore, the photon mode photochromic reaction which is the decoloration reaction is facilitated by temperature rise, to abruptly progress at a prescribed temperature with nonlinearity. Therefore, it is also possible to employ this material for the masking layer according to the present invention.

While the recording layer is made of a magneto-optical recording material in the aforementioned embodiment, the present invention is not restricted to this but is also applicable to a bit formation recording medium such as a compact disk and a phase change type medium, while the same is also readily applicable to a short-wavelength laser and mark edge recording.

The coloring laser beam source can also be formed by an SHG laser or a blue semiconductor laser, which is expected to be put into practice in the near future, if absorption characteristics of the masking layer are optimized. Such lasers are also employable for the reproducing beam source and lasers having a longer wavelength are employable for the coloring beam source.

While the coloring beam spot and the reproducing beam spot are condensed on the optical recording medium by the same objective lens in the above embodiment, it is also possible to employ different optical systems for condensing these beams on the optical recording medium respectively.

According to the present invention, the masking layer is converted to a state having small absorption at the wavelength of the reproducing beam by a thermal reaction or a photon mode photochromic reaction which is facilitated by temperature rise upon irradiation with the reproducing beam. Decoloration of such a masking layer abruptly progresses as a temperature increases, whereby high nonlinearity can be attained. Therefore, it is possible to attain a super-resolution effect by providing such a masking layer for reducing an effective spot size for reproduction as compared with the reproducing beam spot, thereby enabling recording/reproduction of information in high density.

The masking layer can be decolored by beam application with temperature rise by heating, to be optically transparent. Thus, the inventive optical recording medium can be handled similarly to a medium which is provided with no masking layer, to maintain compatibility.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical recording medium comprising:

a recording layer; and a masking layer which has the capacity to:

be converted to a state having low absorption of light having the wavelength of a reproducing beam through a photon mode photochromic reaction facilitated by temperature rise upon irradiation with said reproducing beam; and not be substantially converted to said state through a thermal reaction in the absence of said photon mode photochromic reaction.

2. The optical recording medium in accordance with claim 1, wherein said masking layer is converted to a state having large absorption at said wavelength of said reproducing beam by a photon mode photochromic reaction upon irradiation with a beam of a specific wavelength being different from said reproducing beam.

3. The optical recording medium in accordance with claim 1, wherein said masking layer is provided on a side of receiving said reproducing beam of said recording layer.

4. A reproducing method for an optical recording medium being adapted to irradiate said recording layer of the optical recording medium in accordance with claim 1 with a reproducing beam for reproducing information recorded therein, said method comprising the steps of:

irradiating said masking layer with a beam of a specific wavelength for reducing transmittance of said masking layer at the wavelength of said reproducing beam; and causing a photon mode photochromic reaction being facilitated by temperature rise by irradiating said masking layer having reduced transmittance with said reproducing beam for improving transmittance of a part of said masking layer corresponding to a part of reproducing beam spot.

5. The reproducing method for an optical recording medium in accordance with claim 4, wherein said beam of a specific wavelength has a spot size being larger than that of said reproducing beam.

6. The optical recording medium as claimed in claim 1 wherein said masking layer has a high optical density prior to its having been subjected to irradiation by said reproducing beam.

7. The optical recording medium as claimed in claim 1 wherein said masking layer comprises a diarylethene.

8. The optical recording medium as claimed in claim 7 wherein said diarylethene comprises a compound of the following structural formula:

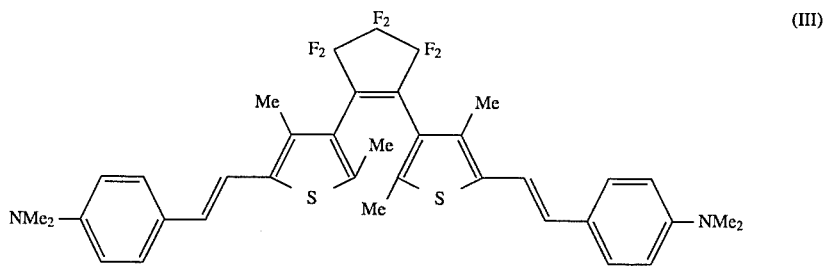
(III)

9. The optical recording medium as claimed in claim 7 wherein said diarylethene comprises a compound of the following structural formula:

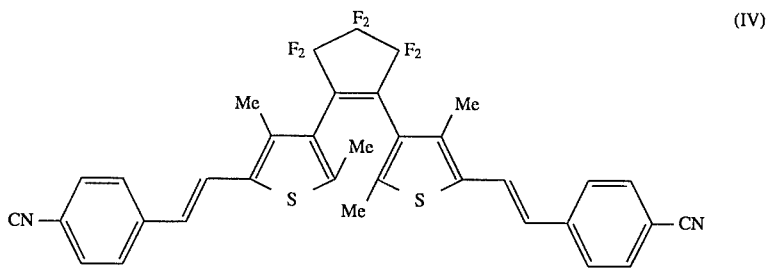
(IV)

10. The optical recording medium as claimed in claim 7 wherein said diarylethene comprises a compound of the formula:

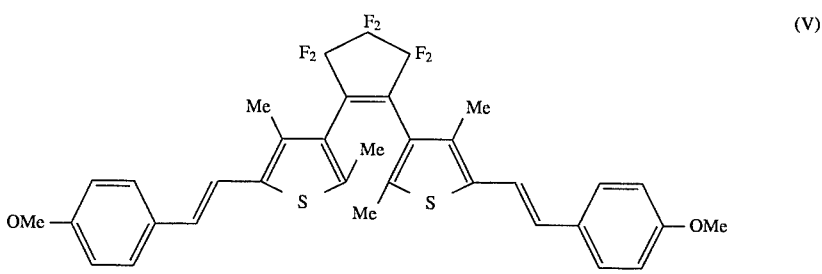
(V)

11. The optical recording medium as claimed in claim 7 wherein said diarylethene comprises a compound of the following structural formula:

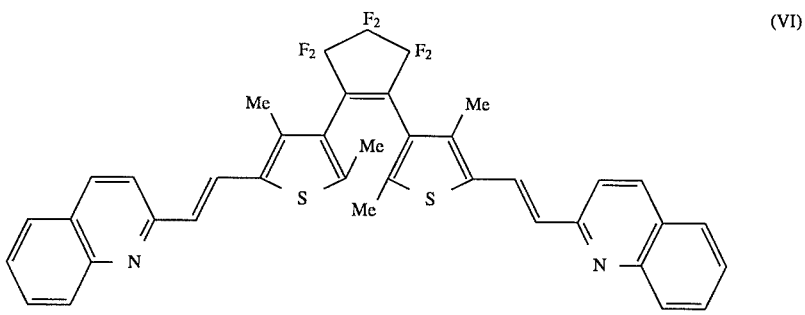
(VI)

12. An optical recording medium comprising:

a recording layer; and a masking layer which contains a sufficient amount of a diarylethene material to facilitate a photon mode photochromic reaction, wherein said diarylethene has the following general formula:

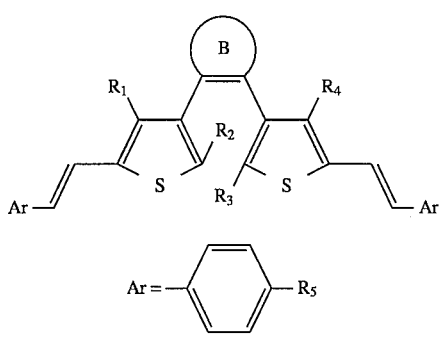
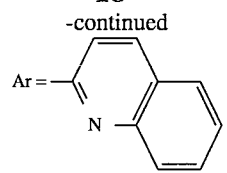
wherein $R_1$ to $R_5$ represent an alkyl group, a halogen atom, a hydrogen atom, a trifluoromethyl group, an alkoxy group, a cyano group, an amino group or a dimethyl amino group, and B represents a hydrocarbon ring or a heterocyclic ring.
* * * * *